Patented Nov. 11, 1952

2,617,778

UNITED STATES PATENT OFFICE 2,617,778

PLASTICIZED POLYMERS

Earl W. Gluesenkamp, Centerville, Ohio, assignor to Monsanto Chemical Company, St. Louis, Mo., a corporation of Delaware No Drawing. Application April 22, 1949, Serial No. 89,153

7 Claims. (Cl. 260—30.8)

This invention relates to new plasticized vinyl chloride resins having desirable properties as are hereinafter described. More particularly the invention relates to valuable plasticizers for polyvinyl chloride and copolymers of vinyl chloride with other monomers, which plasticizers are useful over a wide range of varying conditions.

The primary purpose of this invention is to provide new resinous compositions which are flexible at low temperatures and retain their desirable plastic state even after prolonged heating at elevated temperatures. A further purpose of this invention is to provide low cost plasticizing compositions for vinyl chloride polymers.

It has been found that mercaptans, available as a low cost by-product of the petroleum industry, are readily converted into valuable plasticizing compounds. The class of plasticizers may be represented by the following structural formula:

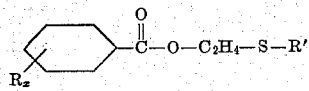

wherein R is a methyl radical or a chlorine atom, $x$ is a whole number from 0 to 2, inclusive, and R' is a hydrocarbon radical having from four to twelve carbon atoms.

The above plasticizing compounds may be prepared by reacting an alkyl, a cycloalkyl or an aralkyl mercaptan with ethylene oxide to form the corresponding mercaptoethanol, which is then esterified with an aromatic acid for example benzoic acid, toluic or chlorobenzoic acid. Alternatively, the esters may be prepared by reacting the mercaptoethanols with the acid chloride, for example benzoyl, toluyl or chlorobenzoyl chlorides. The alkyl, cycloalkyl or aralkyl mercaptoethanols may be prepared by reacting mercaptoethyl alcohol with an olefin, such as cyclohexene, styrene, or mixtures of hydrocarbon olefins.

If desired the mercaptans may be made by reacting olefins with hydrogen sulfide. Thus, an important sub-class of the type of compounds are those derived by reacting styrene with hydrogen sulfide, condensing the mercaptan with ethylene oxide and finally esterifying with benzoic acid or a suitable substituted benzoic acid. Suitable mercaptans for the preparation of the new plasticizing compositions are the straight or branched chain alkyl mercaptans, such as t-butyl, n-butyl, amyl, hexyl, n-octyl, t-octyl, 2-ethylhexyl, nonyl, dodecyl, and other alkyl mercaptans having from four to twelve carbon atoms, or mixtures of alkyl mercaptans, for example those prepared by reacting hydrogen sulfide with mixtures of hydrocarbon olefins. The cycloaliphatic mercaptans or the araliphatic mercaptans, such as cyclohexyl mercaptan, phenethyl mercaptan, and other mercaptans made by the reaction of hydrogen sulfide with cycloalkenes and aromatic substituted alkenes, and other aliphatic cycloaliphatic, or araliphatic mercaptans having from four to twelve carbon atoms.

The mercaptans, after condensation with an equal molar quantity of ethylene oxide are esterified with monobasic aromatic acids, for example benzoic acid, toluic acid and chlorobenzoic acid, or other acids having up to two methyl and/or chlorine groups on the benzene ring.

The new compounds are valuable plasticizers for polyvinyl chloride and copolymers of more than 70 percent of vinyl chloride and up to 30 percent of other monomers copolymerized therewith, for example vinyl acetate and other vinyl esters of monocarboxylic acids, ethyl maleate, ethyl fumarate and other alkyl esters of maleic and fumaric acids.

The plasticizers are blended with the vinyl resin in the conventional manner, for example by mixing on a roll mill, a Banbury type mixer or any other suitable mixing device. The plasticizers are used in proportions necessary to achieve the desired plasticity. Although the quantity of plasticizer will depend upon the particular polymer to be plasticized, it is generally found that from 5 to 60 percent of plasticizer will in most cases produce a satisfactory composition for general utility. Such quantity of plasticizer will generally remain as a permanent part of the vinyl resin and the modified vinyl resin so prepared will not deteriorate or become embrittled by reason of the loss of the plasticizer during use.

The value of the plasticizers are estimated by three tests (1) compatibility (2) volatility and (3) Clash-Berg flex temperature. The compatibility is determined by visual inspection, clarity being a requisite in many applications for vinyl chloride polymers. The volatility is estimated by the test of heating at 105° C. for 24 hours and measuring the percentage of the plasticizers evaporated by loss of weight. The Clash-Berg flex temperature is determined by cooling the polymer sample to about —50° C. and observing the change in the modulus of rigidity as the sample warms up to room temperature, the flex temperature being that at which the modulus of rigidity is 135,000 pounds per square inch. Of these tests the compatibility is of primary importance while the others are only critical for certain applications. If the polymer is to be subjected to outside weather conditions flex temperatures of −20 to −30° C. are desirable, otherwise 0° C. is satisfactory. If the polymer is to be subjected to elevated temperatures a volatility of 5 to 10 percent is advantageous, otherwise volatilities as high as 25 percent are often not objectionable. The volatilities and flex temperatures of polymer plasticizer blends are difficult to predict and often have no apparent relationship to the physical constants of the plasticizer.

The new plasticizers are of general utility in softening vinyl chloride polymers and are useful over a wide range of temperatures. They may be used as the only plasticizing component in a compounded vinyl chloride polymer or they may be used in conjunction with other plasticizers.

Further details of the practice of this invention are set forth with respect to the following specific examples.

*Example 1*

A three-necked, round bottom flask provided with a thermometer and a dropping funnel was charged with 36.4 grams of β-phenethylmercaptoethanol, 100 ml. of ethyl ether and 25 grams of pyridine. The mixture was cooled to a temperature between 0 and 5° C., and while stirring vigorously 29 grams of benzoyl chloride was added during a period of thirty minutes. The reaction mass was then stirred for two hours more at room temperature. The pyridine salt precipitated was washed out of the solution along with traces of unreacted acid. After drying over anhydrous sodium sulfate the product was distilled at 2 mm. of mercury. The fraction boiling between 215 and 220° C. was identified as β-phenethylmercaptoethyl benzoate.

*Example 2*

A 500 ml. flask provided with a reflux condenser was charged with 100 grams of phenethylmercaptoethanol, 60 ml. of toluene and 50 grams of mixed crude toluic acids. The contents of the flask were heated at reflux temperature for eighteen hours, during which time approximately the theoretical quantity of water was separated by a Dean and Stark trap. The reaction mixture was topped by heating to 115° C. to remove the more volatile components. The residue was then diluted with 200 ml. of hexane, and mixed with a solution of seven grams of sodium hydroxide in 100 ml. of water. After separation, the non-aqueous layer was stirred with six grams of decolorizing charcoal and ten grams of potassium carbonate. After filtering, the filtrate was distilled and the fraction boiling between 180 and 182° C. at a pressure of 0.3 mm. of mercury was separated. The product was identified as a mixture of phenethylmercaptoethyl toluates.

*Example 3*

The effectiveness of the compounds described in Examples 1 and 2, were measured using the volatility and flex temperature tests described above. Polyvinyl chloride compositions were prepared by milling polyvinyl chloride with 40 percent by weight of the plasticizers and preparing standard test samples therefrom. The following table sets forth the measurements observed.

| The Ester of— | Volatility, percent | Flex Temp., °C. |
|---|---|---|
| Example 1 | 8 | −28 |
| Example 2 | 4.55 | −26 |

The invention is defined by the following claims.

I claim:

1. A polymer of 70 to 100 percent by weight of vinyl chloride and up to 30 percent of another polymerizable monomer, said copolymer containing intimately dispersed therein from 5 to 60 percent of an ester of the following structural formula:

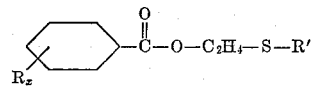

wherein R is a radical of the group consisting of methyl and chlorine, $x$ is a whole number from zero to two, inclusive, and R' is a hydrocarbon radical having from four to twelve carbon atoms.

2. A composition of matter comprising a vinyl chloride polymer and from 5 to 60 percent thereof of β-phenethylmercaptoethyl toluate.

3. A composition of matter comprising a vinyl chloride polymer and from 5 to 60 percent thereof of β-phenethylmercaptoethyl benzoate.

4. A composition of matter comprising polyvinyl chloride and a t-alkylmercaptoethyl toluate wherein the alkyl group has from four to twelve carbon atoms.

5. A composition of matter comprising polyvinyl chloride and a n-alkylmercaptoethyl toluate wherein the alkyl group has from four to twelve carbon atoms.

6. A polymer of 70 to 100 per cent by weight of vinyl chloride and up to 30 per cent of another polymerizable monomer, said polymer containing intimately dispersed therein from five to 60 per cent of an ester having the following structural formula:

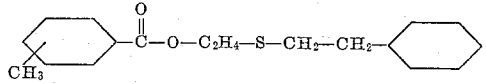

7. A polymer of from 70 to 100 per cent by weight of vinyl chloride and up to 30 per cent of another polymerizable monomer, said polymer containing intimately dispersed therein from five to 60 per cent by weight of an aralkylmercaptoethyl ester of a monobasic aromatic acid.

EARL W. GLUESENKAMP.

REFERENCES CITED

The following references are of record in the file of this patent:

UNITED STATES PATENTS

| Number | Name | Date |
|---|---|---|
| 1,422,869 | Kranzlein | July 18, 1922 |
| 2,157,697 | Hagedorn | May 9, 1939 |
| 2,460,436 | Shoemaker et al. | Feb. 1, 1949 |